(12) United States Patent
Kaltenbach

(10) Patent No.: US 8,825,337 B2
(45) Date of Patent: Sep. 2, 2014

(54) METHOD FOR OPERATING A DRIVE TRAIN

(75) Inventor: Johannes Kaltenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 156 days.

(21) Appl. No.: 13/695,843

(22) PCT Filed: Apr. 4, 2011

(86) PCT No.: PCT/EP2011/055160
§ 371 (c)(1),
(2), (4) Date: Nov. 2, 2012

(87) PCT Pub. No.: WO2011/141233
PCT Pub. Date: Nov. 17, 2011

(65) Prior Publication Data
US 2013/0060411 A1  Mar. 7, 2013

(30) Foreign Application Priority Data

May 12, 2010  (DE) .......................... 10 2010 028 936

(51) Int. Cl.
| | |
|---|---|
| G06F 17/00 | (2006.01) |
| F16H 61/04 | (2006.01) |
| B60W 10/08 | (2006.01) |
| B60W 10/111 | (2012.01) |
| B60W 20/00 | (2006.01) |
| B60W 30/19 | (2012.01) |
| B60K 6/48 | (2007.10) |
| F16H 3/095 | (2006.01) |
| F16H 3/097 | (2006.01) |
| F16H 61/682 | (2006.01) |

(52) U.S. Cl.
CPC .... *F16H 61/0403* (2013.01); *B60K 2006/4825* (2013.01); *B60W 10/08* (2013.01); *B60W 10/111* (2013.01); *B60W 20/00* (2013.01); *B60W 30/19* (2013.01); *B60W 2510/088* (2013.01); *F16H 3/095* (2013.01); *F16H 3/097* (2013.01); *F16H 61/682* (2013.01); *F16H 2061/0422* (2013.01); *F16H 2061/0433* (2013.01); *Y02T 10/6252* (2013.01)

USPC ........................................................... 701/87

(58) Field of Classification Search
CPC .. Y02T 10/6286; B60K 6/445; B60K 28/165; B60W 10/06; F16H 61/0213
USPC ..................... 701/22, 84, 87, 101; 477/34, 75
See application file for complete search history.

(56) References Cited

U.S. PATENT DOCUMENTS

| | | | |
|---|---|---|---|
| 6,319,168 B1 | 11/2001 | Morris et al. | |
| 6,502,652 B2 * | 1/2003 | Rogg | 180/65.21 |

(Continued)

FOREIGN PATENT DOCUMENTS

| | | |
|---|---|---|
| DE | 101 19 503 A1 | 11/2001 |
| DE | 10 2005 051 382 A1 | 5/2007 |

(Continued)

OTHER PUBLICATIONS

German Search Report Corresponding to DE 10 2010 028 936.1.

(Continued)

*Primary Examiner* — Mary Cheung
(74) *Attorney, Agent, or Firm* — Davis & Bujold, PLLC; Michael J. Bujold

(57) ABSTRACT

A method of operating a drive-train having a drive aggregate comprising an electric machine and internal combustion engine. An automated variable-speed transmission is connected between the engine and a drive output. The electric machine couples, via a friction clutch, a shaft of the transmission. Gearshifts are carried out in the transmission with an interruption of the drive torque provided by the drive aggregate in such manner that first the drive torque, provided at the output, is reduced to zero, then the actual gearshift is carried out, and then the drive torque, at the output, is again built up. To accomplish the gearshift, after disengaging a current gear and before engaging a target gear, the shaft of the transmission, which couples the electric machine via the friction clutch, is synchronized utilizing the inertial mass of the electric machine.

13 Claims, 3 Drawing Sheets

(56) References Cited

U.S. PATENT DOCUMENTS

| | | |
|---|---|---|
| 6,591,705 B1 * | 7/2003 | Reik et al. .................. 74/343 |
| 7,644,790 B2 | 1/2010 | Roske et al. |
| 2006/0169504 A1 | 8/2006 | Oliver et al. |

FOREIGN PATENT DOCUMENTS

| DE | 10 2006 003 725 A1 | 8/2007 |
|---|---|---|
| DE | 10 2008 002 380 A1 | 12/2009 |
| EP | 1 209 017 A2 | 5/2002 |
| WO | 98/40647 A1 | 9/1998 |

OTHER PUBLICATIONS

International Search Corresponding to PCT/EP2011/055160.
Written Opinion Corresponding to PCT/EP2011/055160.

* cited by examiner

METHOD FOR OPERATING A DRIVE TRAIN

This application is a National Stage completion of PCT/EP2011/055160 filed Apr. 4, 2011, which claims priority from German patent application serial no. 10 2010 028 936.1 filed May 12, 2010.

FIELD OF THE INVENTION

The invention concerns a method for operating a drive-train of a motor vehicle.

BACKGROUND OF THE INVENTION

The main components of a drive-train of a motor vehicle are a drive aggregate and a transmission. The transmission converts rotational speeds and torques and thereby transmits a traction force provided by the drive aggregate to a drive output of the drive-train. The present invention concerns a method for operating a drive-train of a hybrid vehicle whose drive aggregate comprises at least an electric machine and an internal combustion engine. Between the internal combustion engine and a drive output is connected an automated variable-speed transmission. The electric machine is coupled by a friction clutch to a shaft of the automated transmission.

In the automated transmission, shifts are carried out with interruption of the drive torque delivered from the drive aggregate to the drive output, namely in such manner that initially, in a first phase the drive torque delivered to the output is reduced, then, in a second phase the actual shift operation is carried out, and thereafter, in a third phase the drive torque at the output is built up again. The carrying out of the actual gearshift or gear change in the automated transmission is divided into several part-phases, namely a first part-phase in which the currently engaged gear of the gearshift to be carried out is disengaged, a second part-phase in which a transmission shaft of the automated transmission is synchronized, and a third part-phase in which once the transmission shaft concerned has been synchronized the target gear of the gearshift or gear change to be carried out is engaged.

In current practice the synchronization of the transmission shaft to be synchronized takes place by means of synchronizer rings. This can result in relatively long shifting times.

Method for operating a drive-train in accordance with the characteristics of the preamble of claim 1 are known from DE 10 2008 002 380 A1 and WO 98/40647 A1.

SUMMARY OF THE INVENTION

Starting from there the present invention addresses the problem of providing a new type of method for operating a drive-train.

That problem is solved by a method according to claim 1. According to the invention, to carry out the actual gearshift once a current gear of the shift concerned has been disengaged and before the target gear of the shift has been engaged, the shaft of the automated transmission to which the electric machine is coupled by the friction clutch is synchronized by making use of an inertial mass of the electric machine.

The present invention proposes to use an inertial mass moment of the electric machine for synchronizing the transmission shaft that has to be synchronized. After the disengagement of the current gear and before the engagement of the target gear of the shift to be carried out, the shaft of the automated transmission that has to be synchronized is subjected to inertial synchronization. This makes it possible to dispense with synchronizer rings, which on the one hand simplifies the structure of the automated transmission and on the other hand shortens the shifting times and curtails the traction force interruption.

With the present invention it is proposed in a first step to reduce the drive torque provided by the electric machine at the drive output while adapting the drive torque provided by the internal combustion engine at the output. In a second step, when the friction clutch is open the speed of the electric machine is brought to a preparatory speed. In a third step the drive torque provided by the internal combustion engine at the drive output is reduced.

BRIEF DESCRIPTION OF THE DRAWINGS

Preferred further developments of the invention emerge from the description given below. An example embodiment of the invention, to which it is not limited, is explained in more detail with reference to the drawing, which shows.

DETAILED DESCRIPTION OF THE PREFERRED EMBODIMENTS

The present invention concerns a method for operating a drive-train of a motor vehicle, namely a hybrid vehicle.

Figure 1:
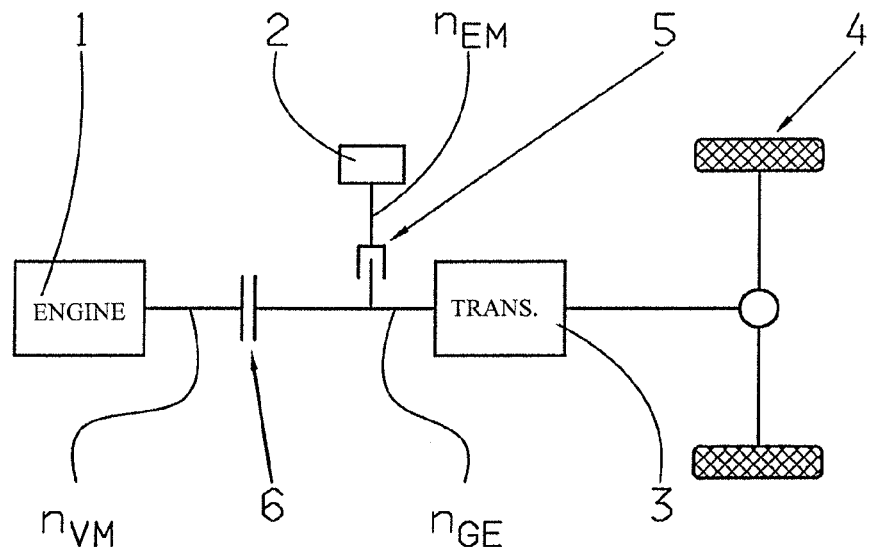
FIG. 1: A block diagram of a first drive-train, to make clear the method according to the invention.

FIG. 1 shows a first drive-train layout of a hybrid vehicle, in which the method according to the invention can be used. The drive-train in FIG. 1 comprises an internal combustion engine 1, an electric machine 2, an automated variable-speed transmission 3 and a drive output 4, the automated transmission 3 being connected between the internal combustion engine 1 and the drive output 4. Likewise, the automated transmission 3 is connected between the electric machine 2 and the output 4.

In FIG. 1 both the internal combustion engine 1 and the electric machine 2 of the drive-train engage with a transmission input shaft of the automated transmission 3. As shown in FIG. 1, the electric machine 2 engages with the transmission input shaft of the automated transmission 3 by way of a friction clutch 5. The internal combustion engine 1 engages with the transmission input shaft of the automated transmission 3 by way of a clutch 6.

When the friction clutch 5 is open, the electric machine 2 is decoupled from the drive output 4. When the clutch 6 is open, the internal combustion engine 1 is decoupled from the output 4.

Accordingly, in the drive-train to be operated in the manner proposed by the present invention, by opening the friction clutch 5 the electric machine 2 can be decoupled from the drive output 4, and this even when the internal combustion engine 1 is coupled to the output 4 because the clutch 6 is closed. Likewise, by opening the clutch 6 the internal combustion engine 1 can be decoupled from the output 4 while the electric machine 2 is coupled to the output 4, if the friction clutch 5 is closed.

As already stated, the transmission 3 is an automated variable-speed transmission. In the automated transmission 3 gearshifts or gear changes are carried out with interruption of the drive torque delivered from the drive aggregate to the drive output 4. For this, as shown in FIG. 4 the process takes place in three phases, initially with a first phase during which, between time points t1 and t4, the drive torque $M_{AB}$ provided by the drive aggregate and delivered to the drive output 4 is reduced to zero, then, in a second phase between times t4 and t7 the actual gearshift is carried out, and finally, in a third phase between times t7 and t8 the drive torque $M_{AB}$ at the output 4 is built up again.

Figure 4:
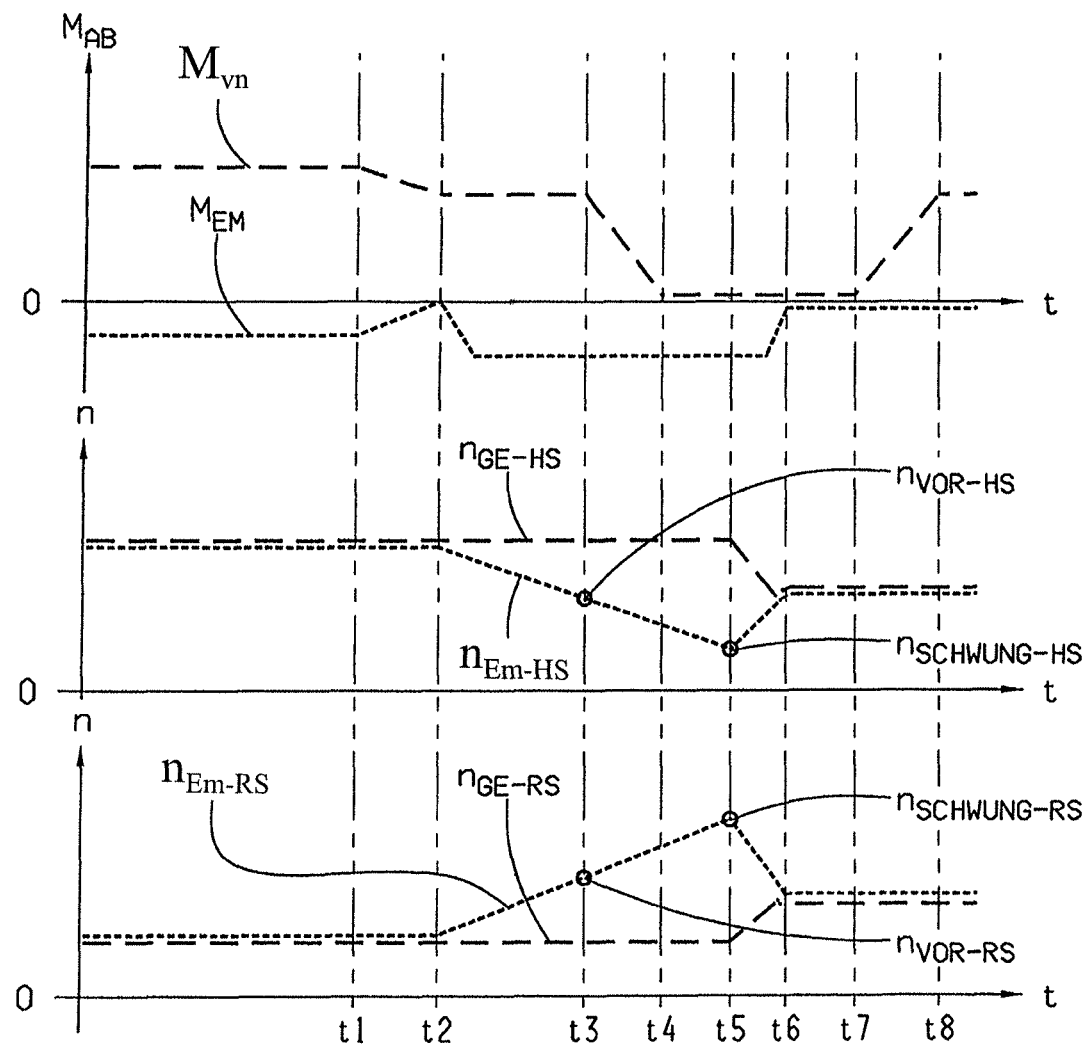
FIG. 4: Diagrams for the further clarification of the method according to the invention.

In the second phase, to carry out the actual gear change or gearshift, a currently engaged gear of the shift to be carried out is first disengaged, namely in FIG. 4 between times t4 and t5, and then, between times t5 and t6, the shaft of the automated transmission 3 to which the electric machine 2 is or can be coupled by the clutch 5 is synchronized, making use for this of the inertial mass of the electric machine 2 so that after this inertial synchronization of the shaft of the automated transmission 3, between times t6 and t7 the target gear of the shift or gear change to be carried out can be engaged.

Below, relevant details of this process are described more exactly with reference to FIG. 4, in which a number of variation curves as a function of time t are shown, namely a time variation of a torque $M_{VM}$ produced by the internal combustion engine 1, a time variation of a torque $M_{EM}$ produced by the electric machine 2, and time variations of rotational speeds $n_{EM\text{-}HS}$ and $n_{EM\text{-}RS}$ of the electric machine 2 and speeds $n_{GE\text{-}HS}$ and $n_{GE\text{-}RS}$ of the shaft of the automated transmission 3 to which the electric machine 2 is or can be coupled by the friction clutch 5, these being shown both for an upshift HS and for a downshift RS.

In FIG. 4 a case is considered, in which before time t1 the drive-train is operating in a hybrid mode such that, as shown in FIG. 4, in the hybrid mode the internal combustion engine 1 is delivering a positive driving torque $M_{VM}$ to the drive output 4, while in contrast the electric machine 2 provides a negative torque $M_{EM}$ at the output 4.

At time t1, implementation of the method according to the invention begins, this time t1 being for example either the moment when a driver initiates a gearshift or when a shifting strategy of the automated transmission 3 recognizes that a gearshift is imminent. The imminence of a gearshift can be recognized by a transmission control unit for control purposes, for example when, upon a driver command, a time gradient of a transmission output speed and a time gradient of a transmission input speed are evaluated.

Beginning at time t1, first the drive torque $M_{EM}$ provided by the electric machine 2 at the output 4 is reduced, and this, as shown in FIG. 4, along with a corresponding adaptation of the torque $M_{VM}$ provided at the output by the internal combustion engine 1.

Thus, it can be seen from FIG. 4 that in the example embodiment illustrated, between times t1 and t2 the generator torque $M_{EM}$ of the electric machine 2 is reduced to zero, whereas the drive torque $M_{VM}$ provided by the internal combustion engine 1 is reduced by the amount of the previously acting generator torque $M_{EM}$ of the electric machine 2.

Between times t1 and t2, between which the load on the electric machine 2 is eliminated and taken up by the internal combustion engine 1, at the same time the friction clutch 5, by which the electric machine 2 is coupled to the shaft of the automated transmission 3 to be synchronized, namely the transmission input shaft in the example embodiment of FIG. 1, is opened so that at time t2 the friction clutch 5 is fully open.

When the friction clutch 5 is fully open, thereafter and beginning at time t2 and between times t2 and t3, the speed $n_{EM}$ of the electric machine 2 is brought to a preparatory speed value $n_{VOR}$ and only when the speed $n_{EM}$ has reached the preparatory speed $n_{VOR}$ is the drive torque $M_{VM}$ from the internal combustion engine 1 reduced to zero.

In the example embodiment illustrated in FIG. 4, the speed $n_{EM}$ of the electric machine 2 reaches the preparatory speed $n_{VOR\text{-}HS}$ or $n_{VOR\text{-}RS}$ at time t3 both when carrying out an upshift HS and when carrying out a downshift RS, so that in FIG. 4, beginning at time t3, the drive torque $M_{VM}$ provided by the internal combustion engine 1 is also eliminated, namely between times t3 and t4, so that at time t4, torque elimination has been completed and no drive torque is any longer applied at the drive output 4.

As said above, the reduction of the drive torque $M_{VM}$ provided by the internal combustion engine 1 only begins at t3 once the speed $n_{EM\text{-}HS}$ or $n_{EM\text{-}RS}$ of the electric machine 2 has been brought to the respective preparatory speed $n_{VOR\text{-}HS}$ or $n_{VOR\text{-}RS}$, namely reduced during an upshift HS or increased during a downshift RS. This can take place in a speed-controlled or in a time-controlled manner.

If the speed $n_{EM}$ of the electric machine 2 is brought to the preparatory speed $n_{VOR}$ between times t2 and t3 in a speed-controlled manner, the speed of the electric machine 2 is determined and compared with a corresponding limit value. If the speed $n_{EM}$ of the electric machine 2 reaches this limit value, which corresponds to the preparatory speed, or falls below it in an upshift HS or exceeds it in a downshift RS, then the reduction of the torque $M_{VM}$ provided at the output 4 by the internal combustion engine 1 can begin.

Alternatively, the speed $n_{EM}$ of the electric machine 2 can also be brought to the preparatory speed $n_{VOR}$ between times t2 and t3 in a time-controlled manner. The procedure for such a time-controlled increase or reduction of the speed $n_{EM}$ to the preparatory speed $n_{VOR}$ is that a residual time is continuously calculated or determined, until the speed $n_{EM}$ of the electric machine 2 reaches an inertial speed $n_{SCHWUNG\text{-}RS}$ above the preparatory speed $n_{VOR\text{-}RS}$ in the case of a downshift RS or an inertial speed $n_{SCHWUNG\text{-}HS}$ below the preparatory speed $n_{VOR\text{-}HS}$ in the case of an upshift HS. In FIG. 4, both when carrying out an upshift HS and when carrying out a downshift RS, the speed $n_{EM}$ reaches the corresponding inertial speed $n_{SCHWUNG}$ at time t5.

After time t5, i.e. after the inertial speed $n_{SCHWUNG}$ has been reached, between times t5 and t6 the inertial synchronization of the shaft of the automated transmission 3 to be synchronized takes place.

The residual time determined is compared with a limit value, this limit value corresponding to the time interval between times t3 and t5.

The limit value with which the residual time determined is compared thus corresponds to the time taken to eliminate the load on the internal combustion engine 1 between times t3 and t4 and to disengage the current gear of the gearshift to be carried out, between times t4 and t5.

The residual time determined during the time-controlled increase or reduction of the speed $n_{EM}$ to the preparatory speed $n_{VOR}$ and compared with the limit value, results from the time gradient of the speed $n_{EM}$ of the electric machine 2 and the expected torque variation of the electric machine 2, namely from the maximum torque that can be provided by the electric machine 2. This maximum torque available from the electric machine 2 for its acceleration depends on the speed $n_{EM}$ of the electric machine 2 and on the power and charge status of the electrical energy accumulator that co-operates with the electric machine 2.

When the electric machine 2 has reached the preparatory speed $n_{VOR}$, which in FIG. 4 is the case at time t3, thereafter as already explained between times t3 and t4 the load reduction at the internal combustion engine 1 is carried out and at the same time the clutch 6 is opened, so that at time t4 the clutch 6 is fully open and the internal combustion engine 1 is decoupled from the drive output 4.

Then, with the clutches 5 and 6 both open, between times t4 and t5 the speed $n_{EM}$ of the electric machine 2 is reduced farther for an upshift HS or increased farther for a downshift RS, namely in the direction of the inertial speed $n_{SCHWUNG-RS}$ or $n_{SCHWUNG-HS}$, respectively above the preparatory speed $n_{VOR-RS}$ in the downshift case or below the preparatory speed $n_{VOR-HS}$ in the upshift case.

When the speed $n_{EM}$ of the electric machine 2 has reached the inertial speed $n_{SCHWUNG}$, which is the case at time t5 in FIG. 4, the friction clutch 5, by which the electric machine 2 is or can be coupled to the automated transmission 3, is closed in order to carry out, between times t5 and t6, the inertial synchronization of the shaft of the transmission 3 to be synchronized. For this, the friction clutch 5 is closed as quickly as possible.

Owing to the inertial mass of the electric machine 2 and the inertial mass of the transmission 3 related to the shaft of the automated transmission 3 to be synchronized, between times t5 and t6, a speed is produced which corresponds to the synchronous speed of the target gear of the gearshift to be carried out.

As already mentioned, for the inertial synchronization, the friction clutch 5 is closed between times t5 and t6, and in this case it is possible during the closing of the clutch 5 to apply a torque by means of the electric machine 2 in order to influence the synchronous speed being produced already by slipping operation of the clutch 5. This influence from the application of torque by means of the electric machine 2 during the closing of the friction clutch 5 preferably takes place as a function of a measured speed variation of the speed $n_{EM}$ of the electric machine 2.

When at time t6 the inertial synchronization of the shaft of the automated transmission 3, to which the electric machine 2 is or can be coupled by the friction clutch 5, has been completed, then between times t6 and t7 the target gear of the gearshift to be carried out is engaged and thereafter, beginning at time t7, between times t7 and t8 the load at the internal combustion engine 1 is built up, in other words with simultaneous closing of the clutch 6.

Between times t6 and t7, i.e. when the target gear of the gearshift being carried out is engaged, if on account of a speed variation of an output-side speed of the automated transmission 3 a next gearshift is already anticipated, then in parallel with the engagement of the new gear, any torque that may be present at the electric machine 2 can be reduced and the friction clutch 5 can be opened again in order then to bring the electric machine 2 once more to a speed which corresponds to the inertial speed needed for the following gearshift.

When between times t5 and t6 the currently engaged gear of the gearshift to be carried out is disengaged, then at the same time as the gear disengagement the internal combustion engine 1 can be brought to the synchronous speed of the gearshift.

The inertial speed $n_{SCHWUNG}$ to which the electric machine 2 is brought, is preferably determined by computer using the following equation:

$$n_{SCHWUNG} = \sqrt{\frac{(J_{EM} + J_{GE}) * n_{GE-ZIEL}^2 - J_{GE} * n_{GE-IST}^2}{J_{EM}}}$$

in which $J_{EM}$ is the mass moment of inertia of the electric machine, $J_{GE}$ is the input-side mass moment of inertia relating to the shaft of the automated transmission to be synchronized, $n_{GE-IST}$ is the input speed of the shaft of the automated transmission to be synchronized in the current gear of the gearshift, and $n_{GE-ZIEL}$ is the input speed of the shaft of the automated transmission to be synchronized in the target gear of the gearshift.

The calculation of the inertial speed $n_{SCHWUNG}$ can be improved by additionally taking into account the inertial energy that is lost during slipping operation of the friction clutch 5 by means of which the electric machine 2 is or can be coupled to the shaft of the automated transmission that is to be synchronized.

The determination of the inertial speed $n_{SCHWUNG}$ can be improved still further by taking account of friction torques which have a braking effect. When an upshift is to be carried out, because of friction, less inertial energy is needed than if the friction were negligible. On the other hand, in a downshift more inertial energy is needed because of friction than if the friction were negligible.

Furthermore, when determining the inertial speed $n_{SCHWUNG}$, a torque that can be provided electrically by the electric machine 2 can be taken into account, this torque being provided by the electric machine 2 for synchronizing the shaft of the automated transmission 3 to be synchronized so that during slipping operation of the friction clutch 5 the electric machine 2 can act in a supportive manner. Thus, in a upshift HS the inertial speed can be increased and in a downshift it can be reduced.

In an advantageous further development of the present invention, the inertial speed $n_{SCHWUNG}$ can undergo adaptation. If, following the closing of the friction clutch 5, which takes place between times t5 and t6, a synchronous speed for the target gear of the gearshift being carried out is not reached, then in this connection the inertial speed $n_{SCHWUNG}$ can be adaptively modified, namely in such manner that if the synchronous speed has been exceeded, the inertial speed is corrected by a negative offset value. On the other hand, if the speed is below the synchronous speed of the target gear, the inertial speed is corrected with a positive offset value. These offset values depend on the gearshift to be carried out, in particular on the target gear of the gearshift being carried out.

The friction clutch 5, by means of which the electric machine 2 can be coupled to the automated transmission 3, is preferably a friction clutch which in its normal condition, i.e. when not actuated, is closed under spring action and can be opened against the spring force of a spring element. In such a case, the friction clutch 5 can be closed rapidly and it is sufficient for the friction clutch 5 to be able to change between two conditions, namely between an open and a closed condition. It is not necessary for the friction clutch 5 to be capable of being regulated.

Figure 2:
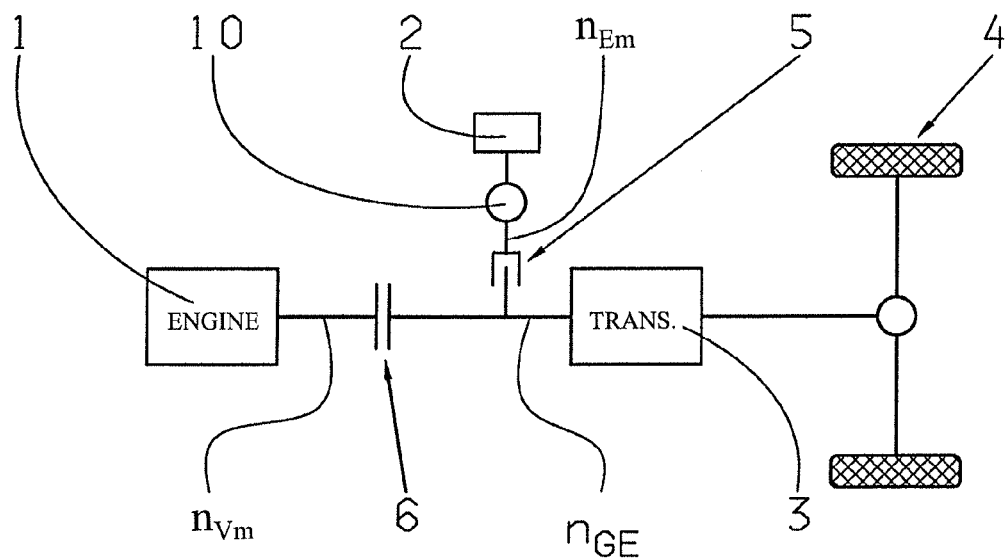
FIG. 2: A block diagram of a second drive-train, to make clear the method according to the invention.
Figure 3:
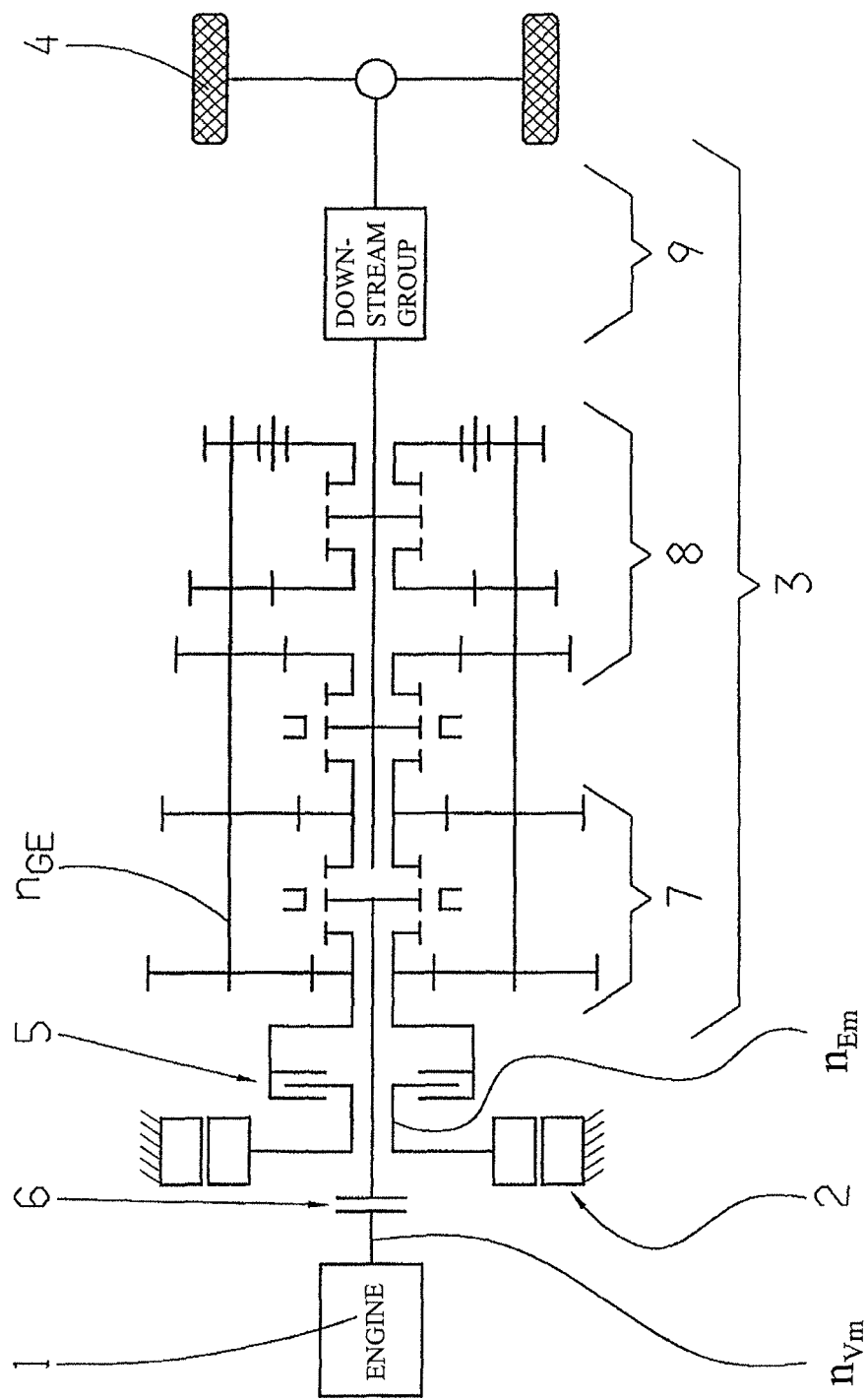
FIG. 3: A block diagram of a third drive-train, to make clear the method according to the invention.

The method according to the invention can be used not only with the drive-train represented in FIG. 1, but also with the drive-trains shown in FIGS. 2 and 3.

In the drive-train of FIG. 2, as with the drive-train of FIG. 1, the electric machine 2 can be coupled by a friction clutch 5 to a transmission input shaft of the automated transmission 3, but in the case of FIG. 2 a constant gear ratio 10 is connected between the friction clutch 5 and the electric machine 2.

With the drive-train of FIG. 2, the method can be implemented in a manner analogous to that described above for the drive-train of FIG. 1, but in the drive-train of FIG. 2, the speed $n_{EM}$ is the speed which, as a function of the speed of the electric machine 2, is imparted by virtue of the constant ratio 10 to the input side of the friction clutch 5.

Moreover, the method according to the invention can also be used with an automated transmission formed as a group transmission which, as shown in FIG. 3, comprises an upstream group 7, a main transmission 8 and a downstream group 9. Besides the main transmission 8, a group transmission can also comprise only an upstream group 7 or only a downstream group 9.

In FIG. 3 the electric machine 2 can be coupled by a friction clutch 5 to a countershaft of the automated transmission 3 formed as a group transmission, whereas the internal combustion engine 1 is coupled by the clutch 6 to the input shaft of the group transmission 3. In the example embodiment shown in FIG. 3, the electric machine 2 is coupled by way of the friction clutch 5 to the upstream group 7, namely to a loose wheel of the upstream group 7 which engages with a fixed wheel mounted on the countershaft to form a gear ratio step with it.

In the drive-train of FIG. 3 the countershaft of the group transmission is synchronized in a manner analogous to the example embodiment shown in FIG. 1, in which the transmission input shaft of the automated transmission is synchronized by the electric machine 2.

In the example embodiment of FIG. 3, the speed $n_{GE}$ is not the speed of the transmission input shaft, but instead the speed of the countershaft to be synchronized.

In contrast to the example embodiment of FIG. 3, it is also possible for the electric machine 2, via the friction clutch 5, to be coupled to a loose wheel of the main transmission 8 or directly to the countershaft.

By making use of the invention, in group transmissions a transmission brake otherwise usually present can be omitted. Simultaneous shifts in the main transmission 8 and in the upstream group 7 are possible. With group transmissions as well, the shifting time required can be made shorter.

INDEXES

1 Internal combustion engine
2 Electric machine
3 Transmission
4 Drive output
5 Clutch
6 Clutch
7 Upstream group
8 Main transmission
9 Downstream group
10 Constant gear ratio

The invention claimed is:

1. A method of operating a drive-train of a motor vehicle with a drive aggregate comprising at the least an electric machine and an internal combustion engine, an automated variable-speed transmission being connected between the internal combustion engine and a drive output, the electric machine being coupled, via a friction clutch, to a shaft of the automated transmission, and gearshifts being carried out, in the automated transmission, with interruption of drive torque delivered by the drive aggregate to the drive output in such manner that the drive torque provided at the drive output is reduced to zero, then after the drive torque being thus reduced, an actual gearshift being carried out and, thereafter, after the actual gearshift being carried out, the drive torque at the drive output again being built up so that, to carry out the actual gearshift after a currently engaged gear of the gearshift concerned has been disengaged and before a target gear of the gearshift is engaged, the shaft of the automated transmission to which the electric machine is coupled via the friction clutch being synchronized by utilizing an inertial mass of the electric machine, the method comprising the steps of:

reducing the drive torque provided at the output by the electric machine to zero while adapting the drive torque provided by the internal combustion engine at the output;

bringing the speed of the electric machine to a preparatory speed, when the friction clutch, which couples the electric machine to the shaft of the automated transmission that is to be synchronized, is disengaged; and reducing the drive torque provided at the output by the internal combustion engine to zero.

2. The method according to claim 1, further comprising the step of only beginning the reduction of the drive torque, provided by the internal combustion engine at the output, when the speed of the electric machine is brought to the preparatory speed in a speed-controlled manner, for which purpose the speed of the electric machine is determined and compared with a limit value.

3. The method according to claim 1, further comprising the step of only beginning the reduction of the drive torque, provided by the internal combustion engine at the output, when the speed of the electric machine is brought to the preparatory speed in a time-controlled manner, for which purpose a residual time, until the speed of the electric machine reaches an inertial speed is determined, the inertial speed being either above the preparatory speed, for a downshift, or below the preparatory speed, for an upshift, and the residual time is compared with a limit value.

4. The method according to claim 1, further comprising the step of disengaging the current gear of the gearshift concerned when the drive torque, provided by the internal combustion engine at the drive output, also is reduced to zero, and either at the same time as or immediately after the disengagement of the current gear of the gearshift, the electric machine is brought to either an inertial speed above the preparatory speed, for a downshift, or below the preparatory speed, for an upshift, and if the electric machine one of reaches, exceeds and falls below the inertial speed, engaging the friction clutch, by which the electric machine is coupled to the shaft of the automated transmission that has to be synchronized, for the inertial synchronization of the shaft to be synchronized.

5. The method according to claim 4, further comprising the step of bringing the internal combustion engine to a synchronous speed of the target gear either simultaneously with or immediately after the disengagement of the current gear of the gearshift.

6. The method according to claim 4, further comprising the step of adaptively modifying the inertial speed after the friction clutch, by which the electric machine is coupled to the shaft of the automated transmission to be synchronized, is engaged, if a synchronous speed has not been achieved, using a negative offset value for the inertial speed if the synchronous speed is exceeded, and using a positive offset value for the inertial speed, if the inertial speed is below the synchronous speed.

7. The method according to claim 1, further comprising the step of determining the inertial speed by a computer using the following equation:

$$n_{SCHWUNG} = \sqrt{\frac{(J_{EM} + J_{GE}) * n_{GE-ZIEL}^2 - J_{GE} * n_{GE-IST}^2}{J_{EM}}}$$

in which $J_{EM}$ is a mass moment of inertia of the electric machine, $J_{GE}$ is an input-side mass moment of inertia relating to the shaft of the automated transmission to be synchronized, $n_{GE\text{-}IST}$ is an input speed of the shaft of the automated transmission to be synchronized in the current gear of the gearshift, and $n_{GE\text{-}ZIEL}$ is an input speed of the shaft of the automated transmission to be synchronized in the target gear of the gearshift.

8. The method according to claim 7, further comprising the step of taking an inertial energy into account during the determination of the inertial speed, the inertial energy is lost during slipping of the friction clutch by which the electric machine is coupled to the shaft of the automated transmission that is to be synchronized.

9. The method according to claim 7, further comprising the step of taking friction torques into account during the determination of the inertial speed.

10. The method according to claim 7, further comprising the step of taking a torque, that is available electrically by the electric machine for synchronizing the shaft to be synchronized, into account during the determination of the inertial speed.

11. The method according to claim 1, further comprising the step of synchronizing a transmission input shaft as the shaft of the automated transmission to be synchronized, to which the internal combustion engine is coupled by a clutch.

12. The method according to claim 1, further comprising the step of synchronizing a countershaft of an automated group transmission as the shaft of the automated transmission to be synchronized, and the internal combustion engine is coupled to a transmission input shaft of the automated group transmission via a clutch.

13. A method of operating a drive-train of a motor vehicle, the drive train having a drive aggregate comprising an electric machine and an internal combustion engine, an automated variable-speed transmission being connected between the internal combustion engine and a drive output, the electric machine being coupled, via a friction clutch, to an input shaft of the automated variable-speed transmission, and gearshifts in the automated variable-speed transmission being accomplished with an interruption of drive torque transmitted by the drive aggregate to the drive output, the method comprising the steps of:

reducing drive torque transmitted by the electric machine to the drive output to zero and reducing drive torque transmitted by the internal combustion engine to the drive output;

disengaging the friction clutch which couples the electric machine to the input shaft of the automated variable-speed transmission;

adjusting a speed of the electric machine to a preparatory speed;

further reducing the drive torque, transmitted by the internal combustion engine to the drive output, to zero;

disengaging a currently engaged gear;

engaging the friction clutch to couple the electric machine to the input shaft of the automated transmission and adjusting the speed of the electric machine from the preparatory speed to an inertial speed to synchronize the input shaft of the automated transmission utilizing an inertial mass of the electric machine; and engaging a target gear and increasing the drive torque transmitted, by the internal combustion engine, to the drive output.

* * * * *